June 11, 1929.  J. M. L. FERRARI  1,717,019
POWER TRANSMISSION
Original Filed May 25, 1926  2 Sheets-Sheet 1

INVENTOR:
Jean Marie Laurent Ferrari
BY: Reuge, Boyer & Bachelor
ATTORNEYS

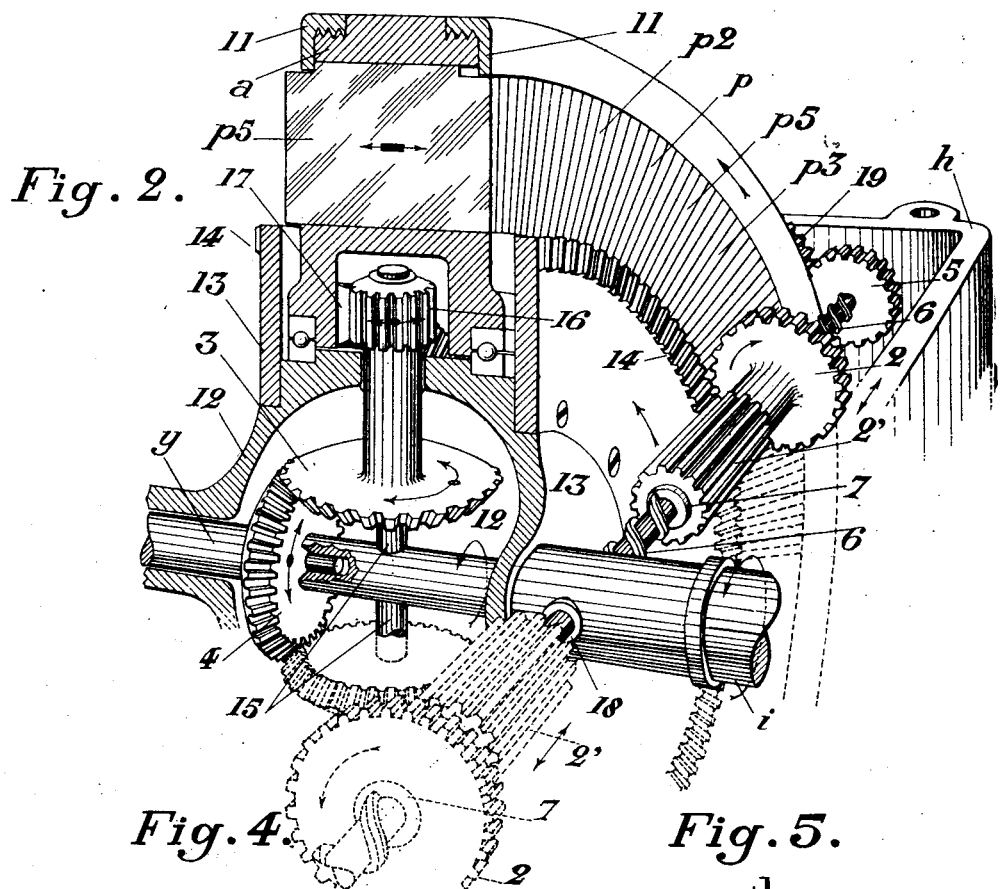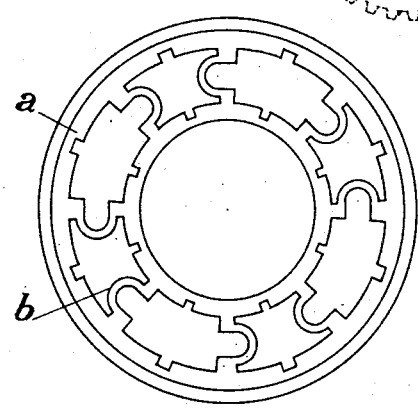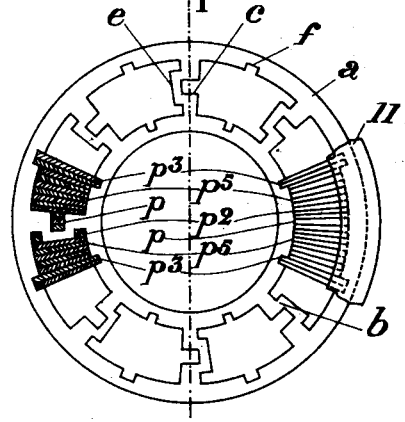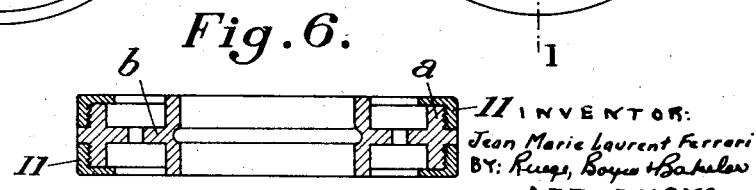

Patented June 11, 1929.

1,717,019

UNITED STATES PATENT OFFICE.

JEAN MARIE LAURENT FERRARI, OF TOULON, FRANCE.

POWER TRANSMISSION.

Original application filed May 25, 1926, Serial No. 111,519, and in France December 11, 1925. Divided and this application filed April 12, 1928. Serial No. 269,445.

The invention concerns a movement governor with progressive variation comprising a power transmission between a driving and a driven shaft lying in the same axis. Said transmission enables a transmission of power at variable speeds allowing a progressive change of the speed, a reversing of the moving direction of the driven shaft and even a stopping of the latter, the members of the transmission remaining always in mesh.

An embodiment of the object of the invention is shown by way of example on the accompanying drawings, wherein Fig. 1 shows an axial section through the driving and driven shaft of a transmission of power at variable speeds allowing a progressive change of the speed, reversing the movement or stopping the rotary motion of the driven shaft.

Fig. 2 is a perspective view of the transmission shown in Fig. 1, a portion of the structure being broken out to show the details of construction.

Fig. 4 shows a detail, to wit a ring with a crown and a nave kept together by curved spokes and openings between said spokes, crown and nave receiving blades in juxtaposition to each other without interruption.

Fig. 5 shows a modified form of the detail shown in Fig. 4, the space between crown and nave being partially filled with blades in juxtaposition to each other, one part being in section, the other part in front view, from which it may be seen, that the spokes do not hinder the blades of forming a closed ring without any interruption.

Fig. 6 is a section along the line 1—1 of Fig. 5, the blades being omitted.

Figure 1:
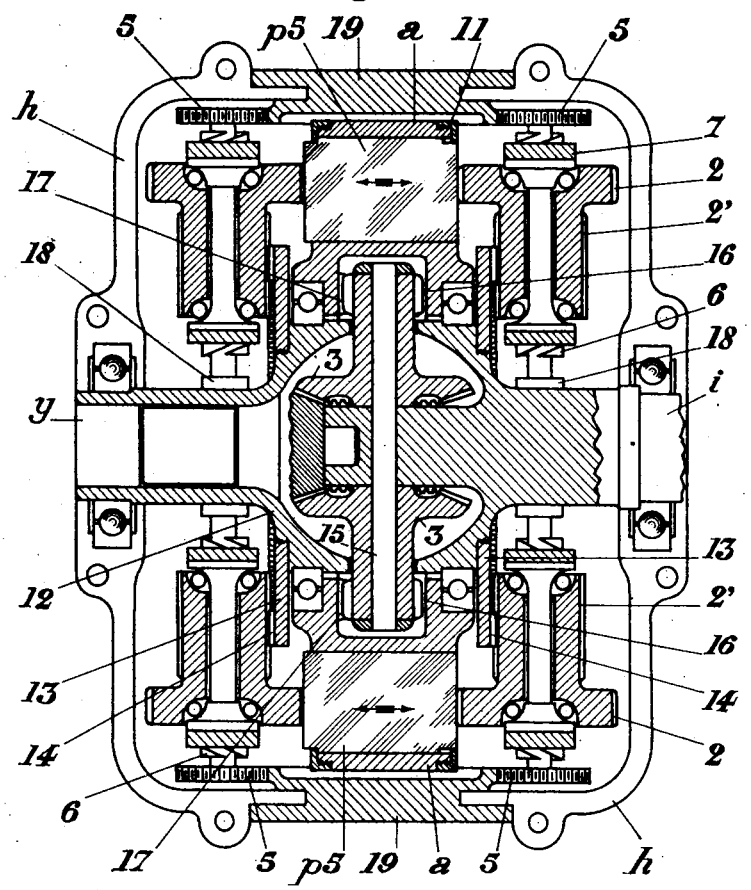
Figure 7:
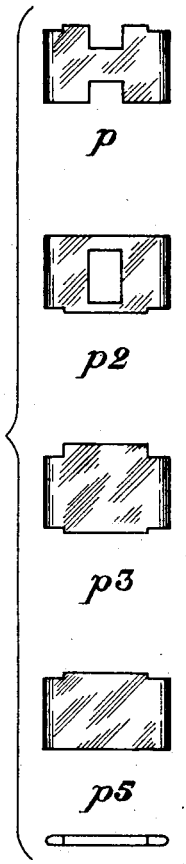

Fig. 7 shows different blades of Fig. 5 in elevation. A driving shaft $i$ lies in line with a driven shaft $y$ and is provided at its end with a nave 13 surrounding the end of the driven shaft next to the end of the driving shaft. This nave 13 forms a spherical hollow chamber, surrounding a bevel pinion 4 fixed at the end of the driven shaft $y$ and two bevel pinions 3 in mesh with pinion 4. Said bevel pinions 3 are supported by a spindle 15 rectangularly fitted to the driving shaft $i$. The nave of each bevel pinion 3 carries a pinion 16 and the pinion 16 gearing with the orbit gear 17 of the nave $b$ of ring $a$—$b$ carrying blades $p$, $p^2$, $p^3$, $p^5$ slidably arranged between crown $a$ and nave $b$ in the direction indicated by a double arrow in Fig. 2 parallel to the axis of the shafts $i$, $y$. Two ball bearings are arranged between nave 12 and ring $a$—$b$. Furthermore the nave 13 carries two flanges 13 perpendicular to the axis of the shafts $i$, $y$. Each flange is provided at the circumference of its surface turned away from the ring $a$—$b$ with teeth, thus forming a gear wheel 14, each being in mesh with two pinions 2'. Each pair of pinions 2' is slidably on a shaft 6 supported by a bearing 18, one of said bearings being mounted on the driving shaft $i$, and the other on the nave 12. The bearings are not driven by the shaft $i$. The naves of pinions 2' carry each at its outer end a gear 2, each nave being mounted on a ball bearing 7 acting as a screw nut on the screw threaded shaft 6. Each screw nut 7 slides on a rail provided on the frame $h$, thus hindering a rotating of the screw nut but enabling a displacement along the threads of shaft 6. At both ends of each shaft 6 is fixed a gear wheel 5 at each end in mesh with a gear wheel 19. By turning one of said gear wheels 19 a displacing of the pinions 2', that is to say, a sliding of its teeth along the teeth of gear wheels 14 is produced.

The driving shaft $i$, integral with nave 12, drives, by means of the teeth 14 the pinions 2' integral with the gear wheels 2, which in turn, gear with the slidably arranged blades $p$, $p^2$, $p^3$ and $p^5$, thus driving the ring $a$. The latter now drives by means of its orbit gear 17 pinions 16 integral with the bevel pinions 3, which are driving the bevel pinion 4 on the driven shaft.

Figure 3:
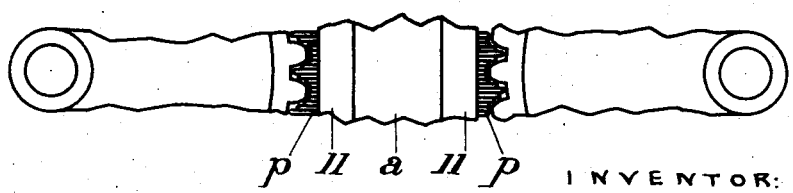
Fig. 3 shows a detail i. e. parts of two pinions and some slidingly arranged blades in mesh with the teeth of both pinions.

As shown in Fig. 7 the blades have rounded edges. As shown in Figs. 2 and 5 the blades are arranged in juxtaposition to another without interruption forming a closed ring. As can be seen from Fig. 3 the teeth of the gears 2 reproduce themselves exactly in said crown of sliding blades in order to rotate the closed ring of blades.

The special form of the blades makes possible, without interference by the spokes, the provision of a closed ring of slidable blades capable of projecting over the flanges 11 screwed on the crown $a$ according to the position of the teeth of the gear wheels 2 in mesh with the blades.

As can be seen from Figure 7 each blade $p$ has two opposite notches corresponding with the ribs of crown $a$ and nave 6. First these blades are brought into the opening between crown and nave on the right place. The blades $p^2$ having each a central opening corresponding to the crank portion of the spokes shown in Fig. 5 are now brought into position, thus carried by the crank portion of the spokes. Finally the blades $p^3$ having two opposite projections and the blades $p^5$ having only one projection are mounted between crown and nave and are maintained in position by the protruding parts of the flanges 11 screwed on the crown $a$. The cranked shape of the spokes allows the blades $p$ and $p^2$ to completely cover them thus forming a closed ring lining the ring $a$—$b$. If the ring $a$—$b$ rotates, the points of the blades near to their outer circumference will have a higher linear speed as the points of the blades near to their inner circumference thus according to the position of the gear wheels 2 relatively to the blades a higher or lower speed may be derived from the pinions $2'$.

Supposing the gearing ratio of the different wheels is so calculated, if the pinions 2 engage with the central portion of the blades $p$, $p^2$, $p^3$, $p^5$, the difference between the speed of the crown $a$ and the driving-shaft $i$ causes the pinion 16, driving the orbit gear 17 to revolve at such a speed that for each complete revolution of the driving-shaft $i$ the bevel pinion 3 will not drive the bevel pinion 4, the driven shaft $y$ will not rotate, though all parts of the transmission are in mesh, and the driving shaft $i$ is revolving at any speed whatever.

If by means of the gear wheels 5 and 19, the pinions 2 are pushed toward the crown $a$, the latter will revolve at a reduced speed and will drive the pinions 16 and 3 slower, so that said pinion 3 will push the bevel pinion 4 of the driven shaft $y$ in the same direction as the driving shaft $i$.

If the pinions 5 are so actuated that the gear wheels 2 are pushed towards the nave $b$ the latter will revolve at a higher speed thus driving the pinions 16 and 3 quicker, so that said pinion 3 will push the bevel pinion 4 of the driven shaft $y$ in a direction opposite to that of the driving shaft $i$.

It may be seen from the foregoing that it is possible to gradually increase or reduce the speed of the driven shaft to stop the latter or to reverse its motion notwithstanding all members of the transmission being in mesh.

What I claim is:

1. In a power transmission the combination of a driving shaft, a driven shaft in line with the latter, a circular member concentric to said shafts, a pinion in mesh with said circular member, a gear cooperating as well with the driven shaft as with the circular member and fixed to the driving shaft, the circular member being rotatably journaled and containing a plurality of radially arranged movable blades in juxtaposition and forming a closed ring, a rotatably mounted pinion driven by the driving shaft and slidably arranged along its own axis the latter perpendicular to the axis of the shafts, said pinion in mesh with the movable blades, means for moving said pinion relatively to the blades so as to bring it in contact with a more or less greater pitch circle on said blades of the circular member, and means for keeping the lining parts of said blades always in cooperation with the teeth of said pinion and constraining said lining parts to follow the circumference of teeth and gaps of the pinion.

2. In a speed change gear the combination of a driving shaft, a driven shaft in line with the latter, a ring shaped rotatably journaled housing concentric to said shaft, a plurality of radially arranged movable blades in juxtaposition and forming a closed ring, said blades being slidable in an axial direction and lining the housing on two surfaces perpendicular to the shafts, two opposite pinions, one at each side of the housing in mesh with the lining parts of the blades, the axis of both pinions being perpendicular to the axis of the shafts and lying in one plane, means for moving both pinions together along their axis relatively to the lining parts of the blades, said pinions driven by the driving shaft, and a gear cooperating as well with the driven shaft as with the housing and fixed to the driving shaft.

3. In a power transmission the combination of a driving shaft, a driven shaft in line with the latter, a ring shaped rotatably journaled member concentric to said shafts, a pinion cooperating with said ringshaped member, a gear cooperating as well with the driven shaft as with the ringshaped member and journaled in the driving shaft, the ringshaped member being constituted by a crown and a nave connected together by curved spokes, a plurality of radially arranged blades in juxtaposition being slidable in an axial direction, lodged between crown and nave, wholly embracing said spokes, said blades forming a closed ring, with lining parts in a plane perpendicular to the shaft, a rotatably mounted pinion driven by the driving shaft and slidably arranged along its own axis the latter perpendicular to the axis of the shafts, said pinion in mesh with the movable blades, means for moving said pinion relatively to the blades so as to bring it in contact with a more or less greater pitch circle on said blades of the circular member, and means for keeping the lining parts of said blades always in cooperation with the teeth of said pinion and constraining said lining parts to follow the circumference of teeth and gaps of the pinion.

In testimony whereof I have signed my name to this specification.

JEAN MARIE LAURENT FERRARI.